United States Patent [19]
de Sebastián

[11] Patent Number: 6,125,860
[45] Date of Patent: Oct. 3, 2000

[54] WASHING CENTERS FOR MACHINERY

[76] Inventor: Fernando Gómez de Sebastián, Llaceras 16, E-08190 Sant Cugat del Vallès, Spain

[21] Appl. No.: 09/225,168

[22] Filed: Jan. 4, 1999

Related U.S. Application Data

[63] Continuation of application No. 08/656,258, filed as application No. PCT/ES95/00110, Oct. 6, 1995, abandoned.

[30] Foreign Application Priority Data

Oct. 6, 1994 [ES] Spain ................................... 9402094

[51] Int. Cl.[7] ................................ B06S 3/04; B08B 3/02; B08B 13/00
[52] U.S. Cl. .................. 134/57 R; 134/58 R; 134/95.2; 134/95.3; 134/99.2; 134/107; 134/113; 134/123; 134/172
[58] Field of Search ................... 134/56 R, 57 R, 134/58 R, 95.2, 95.3, 99.2, 107, 113, 123, 172

[56] References Cited

U.S. PATENT DOCUMENTS

| | | | |
|---|---|---|---|
| 3,229,703 | 1/1966 | Thompson et al. | 134/123 X |
| 3,400,725 | 9/1968 | Miller et al. | 134/123 X |
| 3,421,526 | 1/1969 | Alkire et al. | 134/123 X |
| 4,880,026 | 11/1989 | Ferre et al. | 134/123 X |
| 4,881,581 | 11/1989 | Hollerback | 134/213 X |
| 4,998,547 | 3/1991 | Klein | 134/123 X |
| 5,033,489 | 7/1991 | Ferre et al. | 134/123 X |
| 5,413,128 | 5/1995 | Butts | 134/123 X |
| 5,447,574 | 9/1995 | Inoue | 134/123 X |

FOREIGN PATENT DOCUMENTS

| | | |
|---|---|---|
| 1455516 | 9/1964 | Germany . |
| 3814726 | 4/1988 | Germany . |
| 456365 | 4/1964 | Switzerland . |
| 2137149 | 3/1984 | United Kingdom . |

Primary Examiner—Philip R. Coe
Attorney, Agent, or Firm—Horst M. Kasper

[57] ABSTRACT

PLANT FOR WASHING MACHINERY, which is characterized by being a compact plant which includes a small engine room of approximately 9m3, inside which the different elements such as the following are housed: pressure pumps, electric motors, a diesel boiler, a hot water accumulator, a plant for osmotizing water, an electronic robot mechanism, an electric switchboard, fuel tanks, osmotized water tank, measurement pumps and auxiliary material. The washing liquids come out under pressure through hoses and reach a manual shuttle.

29 Claims, 14 Drawing Sheets

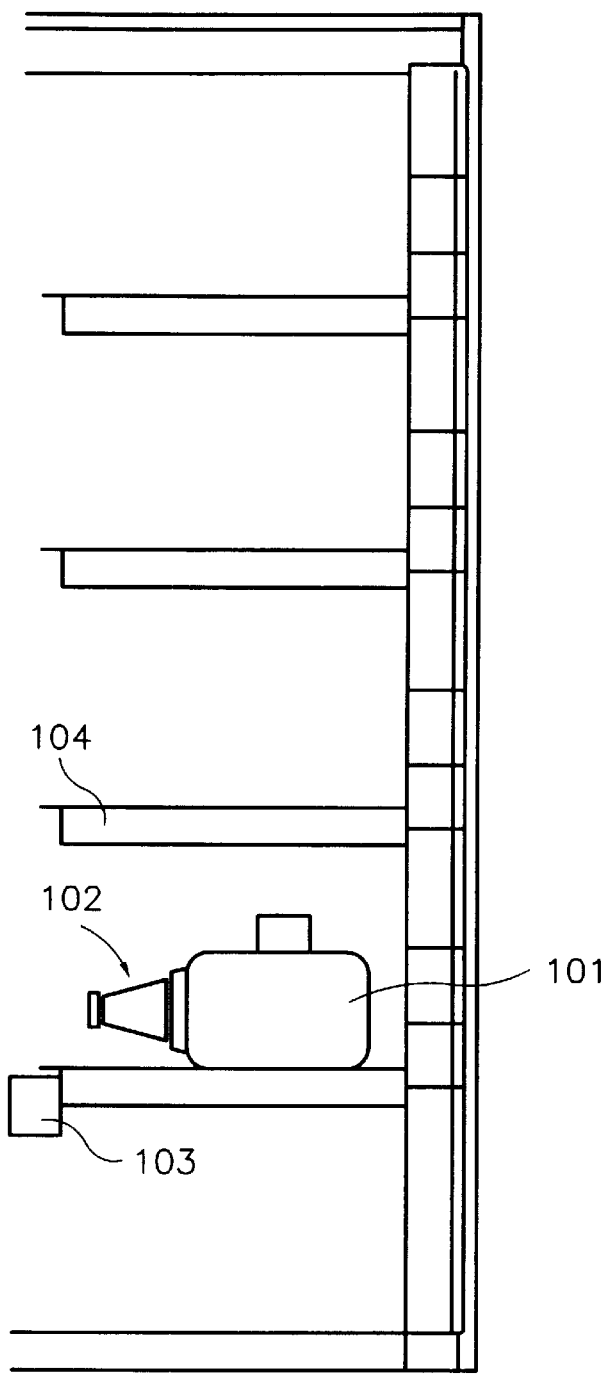
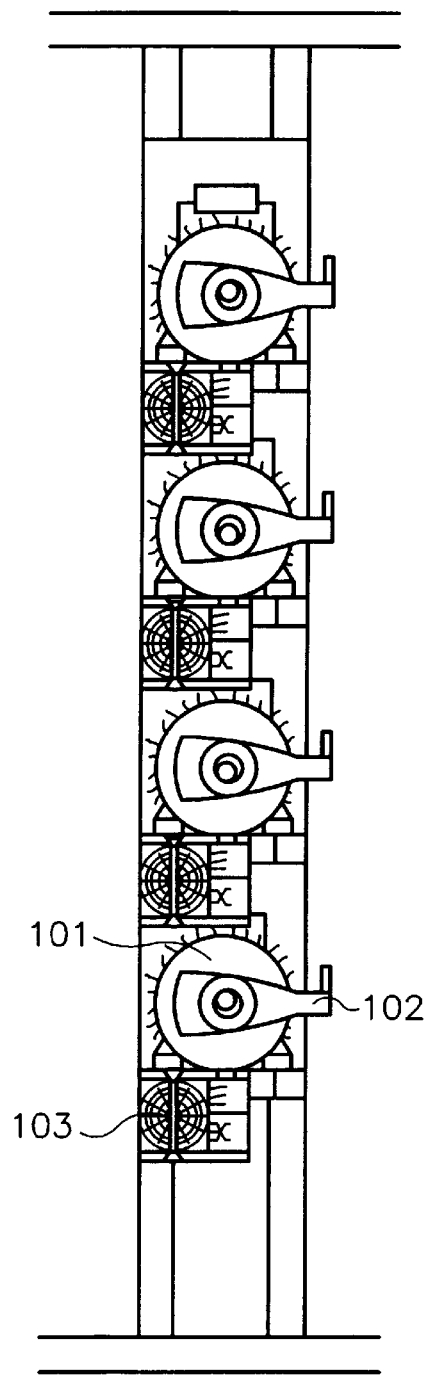
Fig.6
Fig.7

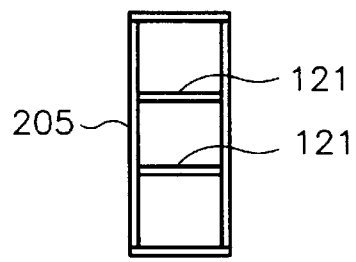 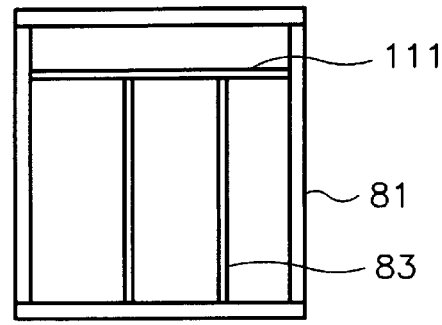
Fig.12  Fig.13
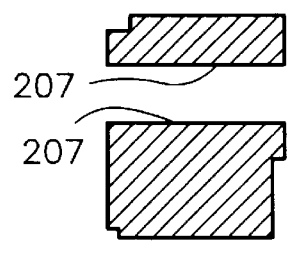 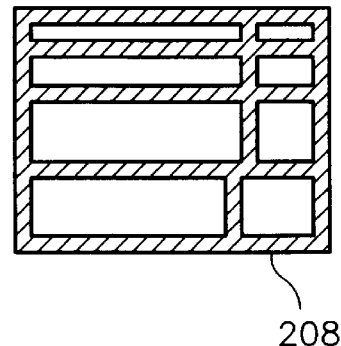 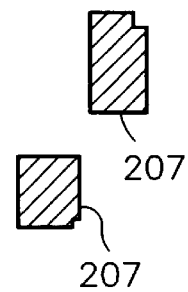
Fig.14  Fig.15  Fig.16

WASHING CENTERS FOR MACHINERY

This application is a continuation of application Ser. No. 08/656,258, filed on Sep. 3, 1996, now abandoned, which is a 371 of PCT/ES95/00110 Oct. 6, 1995.

BACKGROUND OF THE INVENTION

1. Field of the Invention

This invention refers to a compact plant destined for washing machinery, whether mobile, like for example vehicles, or static, like for example that installed in an industrial plant.

2. Brief Description of the Background of the Invention Including Prior Art

Centres and installations for washing machinery as is the case of car wash tunnels, at the present need a considerable space owing to the combination of detergents and waters they use and the layout of the corresponding feed lines.

This need means that these centres for washing machinery cannot be installed in all the premises that wish to have them. The current nature of these washing centres also restricts their use and therefore, for example, the car wash tunnel is not the best place for washing a motorcycle.

SUMMARY OF THE INVENTION

1. Purposes of the Invention

It is an object of the present invention to provide for a plant for washing machinery, which plant is compact and can be employed for washing mobile machinery of fixedly installed machinery.

These and other objects and advantages of the present invention will become evident from the description which follows.

2. Brief Description of the Invention

In order to overcome these problems, the compact plant has been thought out which will be used as the centre for washing machinery, whether automobile or static but moveable, which includes a small engine room with approximate measurements of 1.5 meters wide, 2.5 meters long and 2.25 meters high, inside which the different elements such as the following are housed: pressure pumps, electric motors, a diesel boiler, a hot water accumulator, a plant for osmotizing water, an electronic robot mechanism, an electric switchboard, fuel tanks, osmotized water tank, measurement pumps and auxiliary material. The osmotization will consist of a process in which the water is first micro-filtered so as to remove particles greater than 80 micras, then it is delimed, then dechlorated, and after that it is micro-filtered again in order to eliminate particles greater than five micras, and finally it is passed through the osmosis membrane container torpedo.

The hot washing water is filtered through 80 micra filters and cationic exchangers and is stored in its own tank so that it is immediately available and when the user needs it comes out under pressure through a hose and reaches a manual shuttle. For rinsing, water from the mains supply is passed through the aforementioned 80 micra filters and cationic exchangers, after which it is pumped to the high pressure shuttle nozzle. In the hot water washing stage deionised water comes out with a preestablished measurement of detergent, the output pressure is some 90 bars and its temperature some 60° C. This hot, pressurised solution emulsifies the dirt. In the following stage, which is rinsing, micro-filtered, delimed water comes out of the shuttle nozzle, at the same pressure as before but at environmental temperature. In a third stage, osmotized water, free of impurities and physio-chemical elements will come out of the nozzle, this gives it a high superficial tension which means it wets the surface of the machine very little. This causes the effect that it is drained very quickly and does away with the need to dry mechanically or by hand. This osmotized water removes the latter which was wetting the surface of the machine, leaving it dry and shiny.

The quality of the wash is obtained thanks to the combination of several factors which are envisaged in the aforementioned elements. On the one hand is the work with the suitable pressure in the shuttle nozzle. On the other is the temperature of 60° C. at the point of contact with the surface to be washed. Finally it is important that the waters used at each one of the washing stages are treated in order to meet with the special function.

The novel features which are considered as characteristic for the invention are set forth in the appended claims. The invention itself, however, both as to its construction and its method of operation, together with additional objects and advantages thereof, will be best understood from the following description of specific embodiments when read in connection with the accompanying drawings.

BRIEF DESCRIPTION OF THE DRAWINGS

In the accompanying drawings, in which are shown several of the various possible embodiments of the present invention:

FIG. 6 is a front view of a pressure pump installation of a washing center for machinery;

FIG. 7 is a side view of the pressure pump installation of FIG. 6;

FIG. 12 is a view of the chassis of the entrance door wing of the invention structure;

FIG. 13 is a view of a second one of the long walls of the invention structure;

FIG. 14 is a view of the metallic paving of the washing center;

FIG. 15 is a view of the lower face of the washing center;

FIG. 16 is a view of additional metallic paving of the washing center.

DESCRIPTION OF INVENTION AND PREFERRED EMBODIMENT

Figure 5:
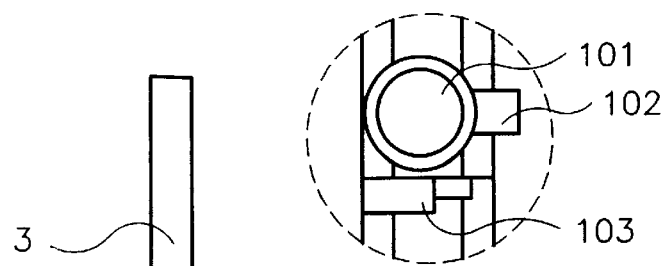
FIG. 5 is a detail view of FIG. 1.
Figure 2:
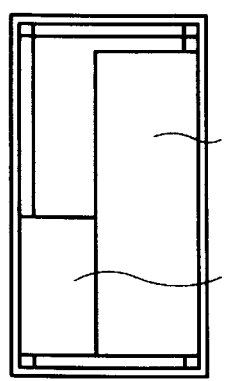
FIG. 2 is a schematic view of the left side of the washing center of FIG. 1.
Figure 1:
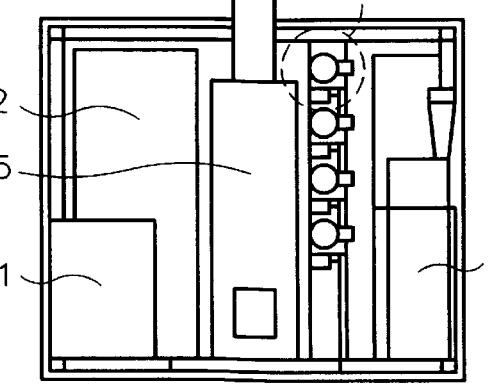
FIG. 1 is a schematic front view of a washing center for machinery.
Figure 3:
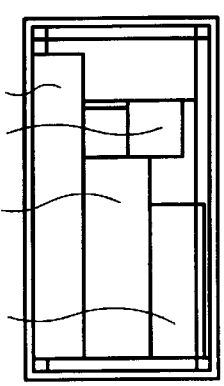
FIG. 3 is a schematic view of the right side of the washing center of FIG. 1.
Figure 4:
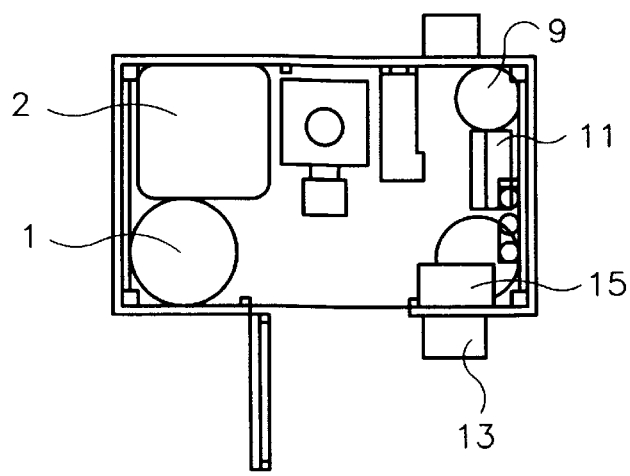
FIG. 4 is a schematic view onto the washing center of FIG. 1.
Figure 8:
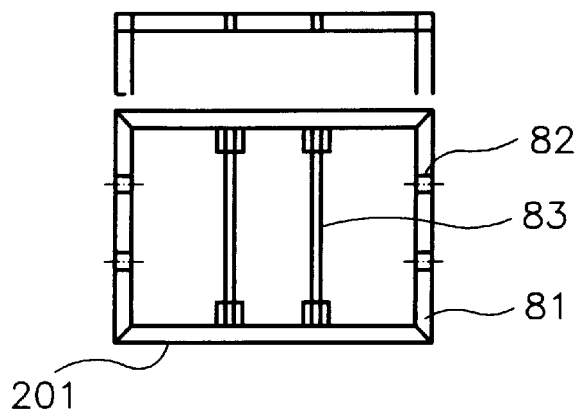
FIG. 8 is a view of the ceiling of the invention structure.
Figure 10:
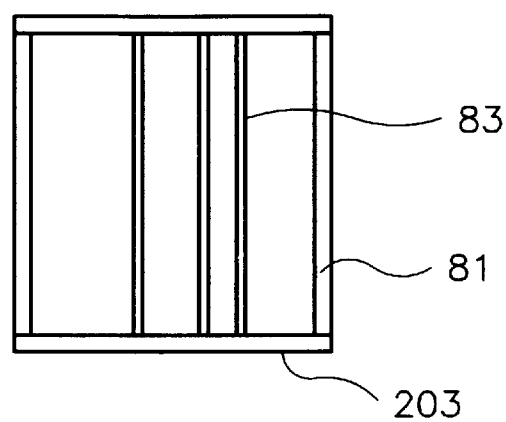
FIG. 10 is a view of a first one of the long walls of the invention structure.
Figure 9:
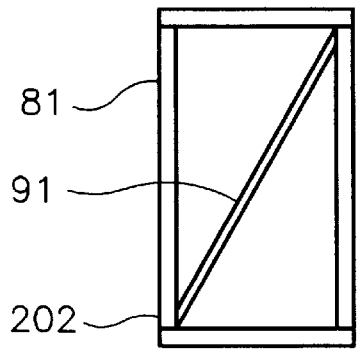
FIG. 9 is a view of a first one of the short walls of the invention structure.
Figure 11:
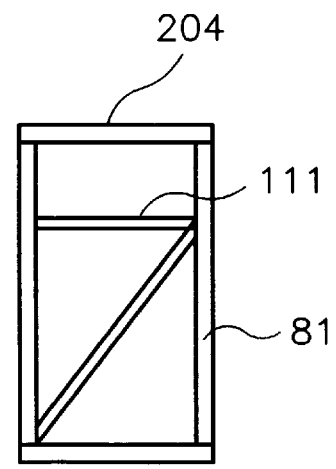
FIG. 11 is a view of a second one of the short walls of the invention structure.
Figure 17:
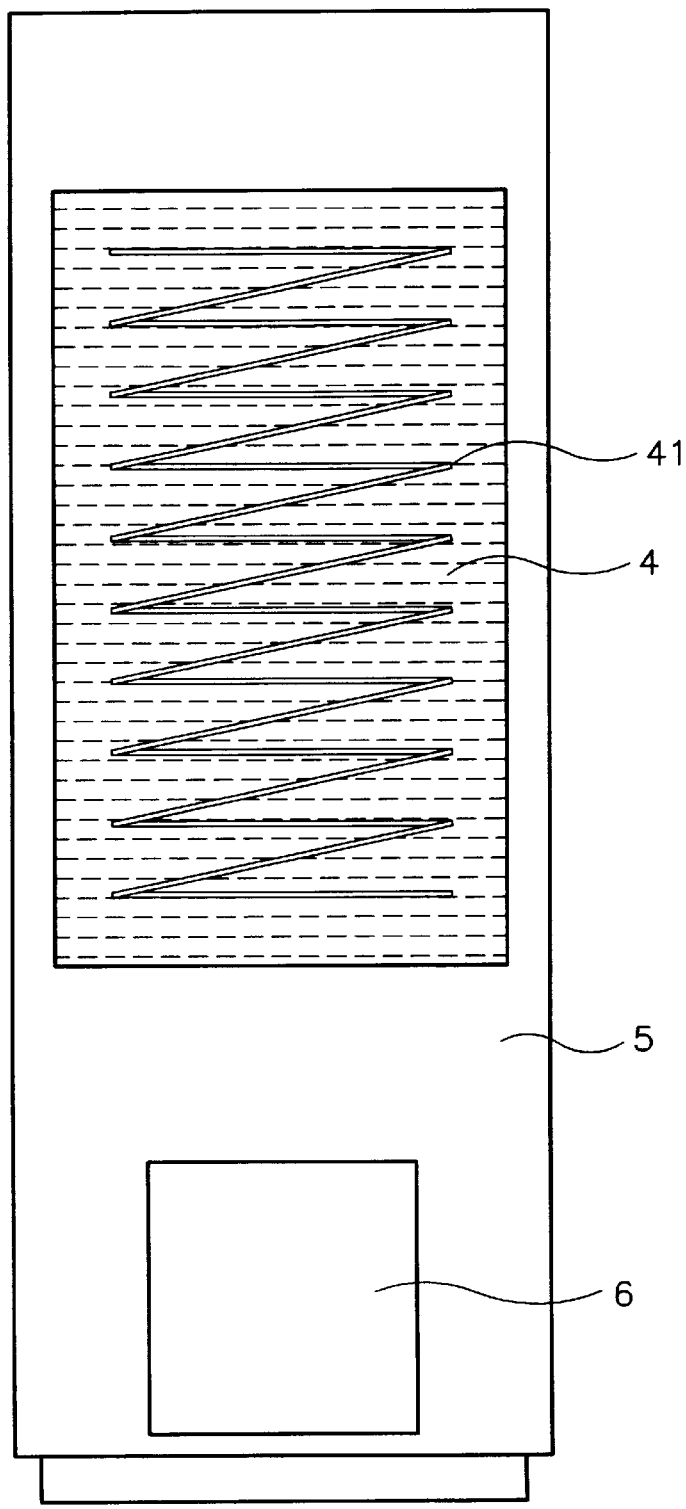
FIG. 17 is a view of a heating system.
Figure 18:
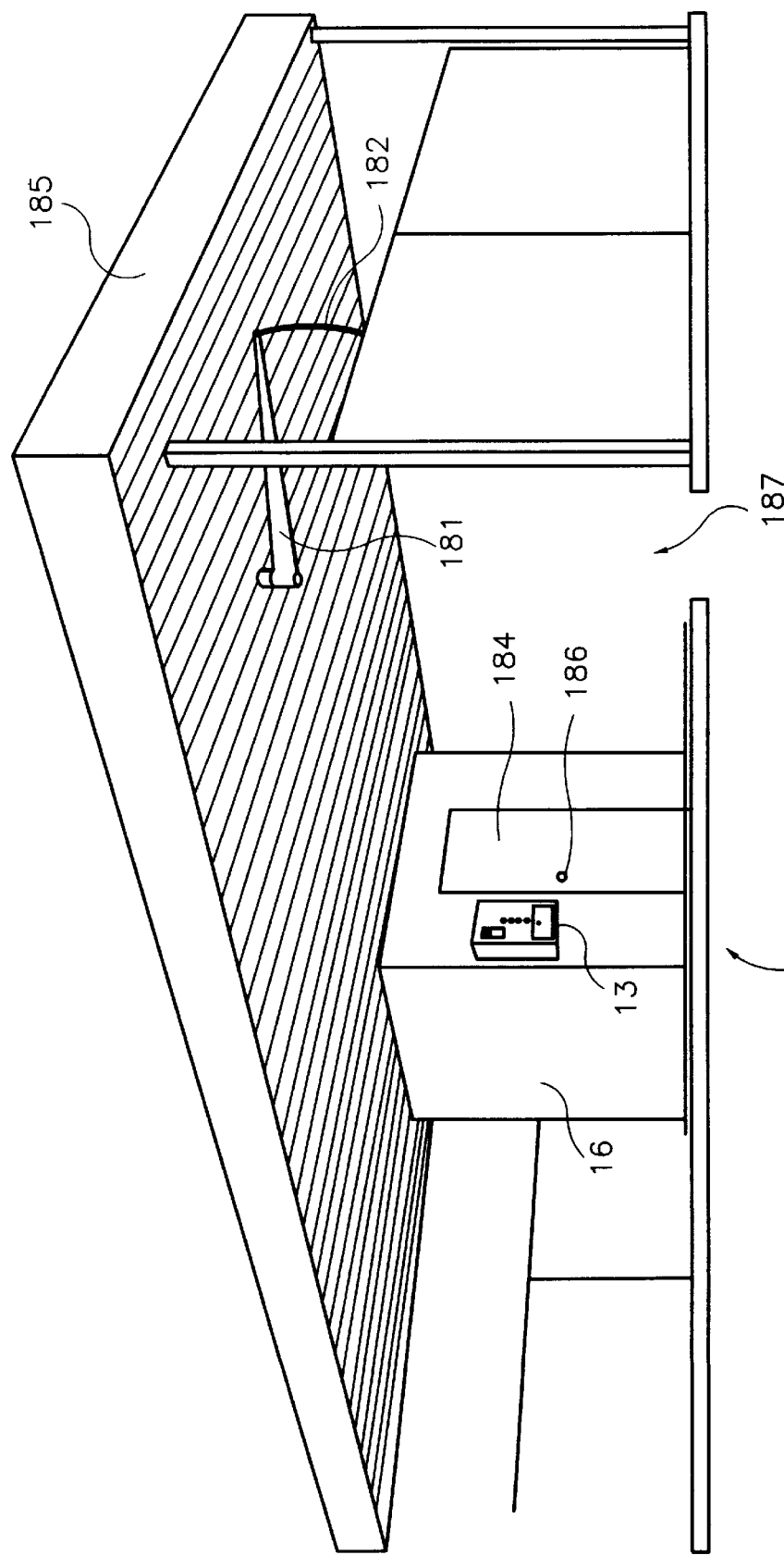
FIG. 18 if a perspective view of a covered washing center.
Figure 19:
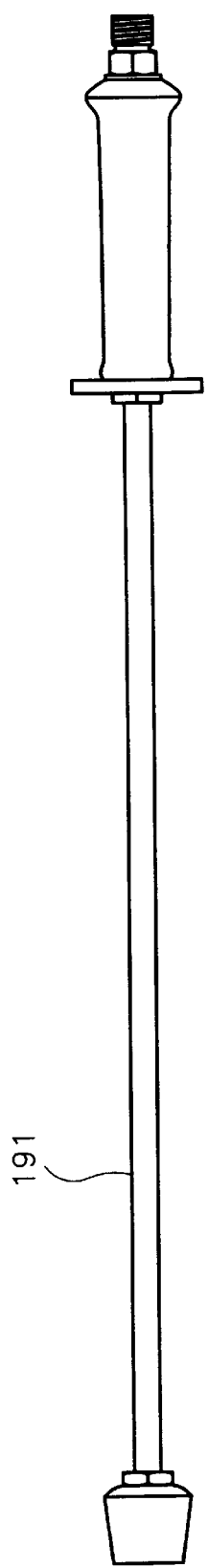
FIG. 19 is a view of a nozzle shuttle.
Figure 21:
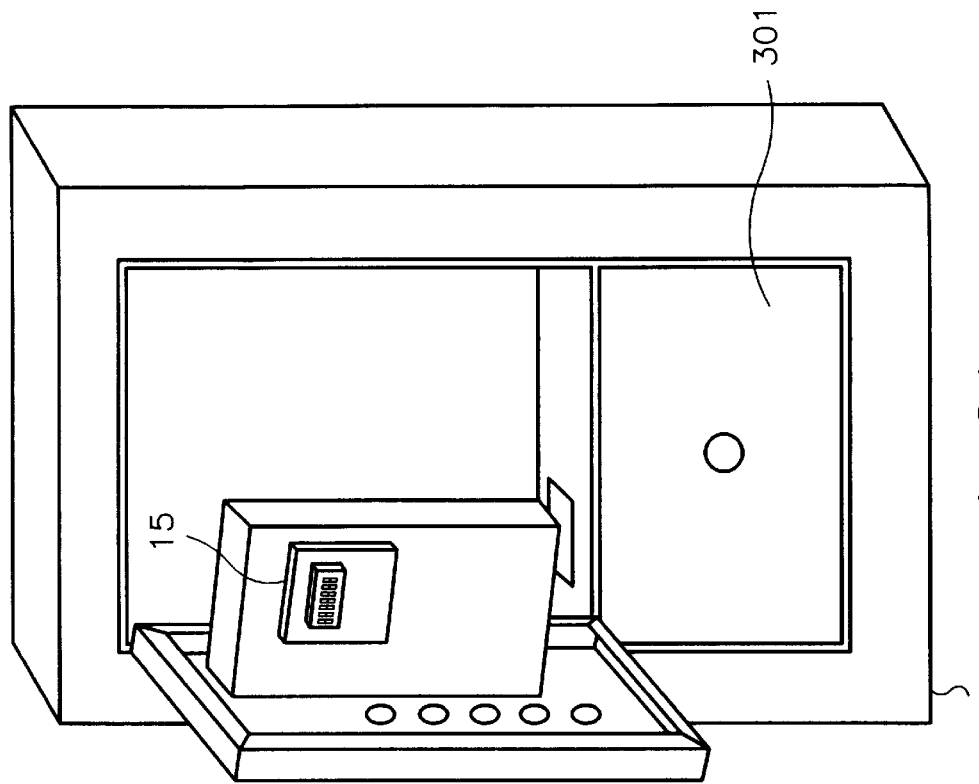
FIG. 21 is a view of an electronic coin-operated machine in an open position.
Figure 20:
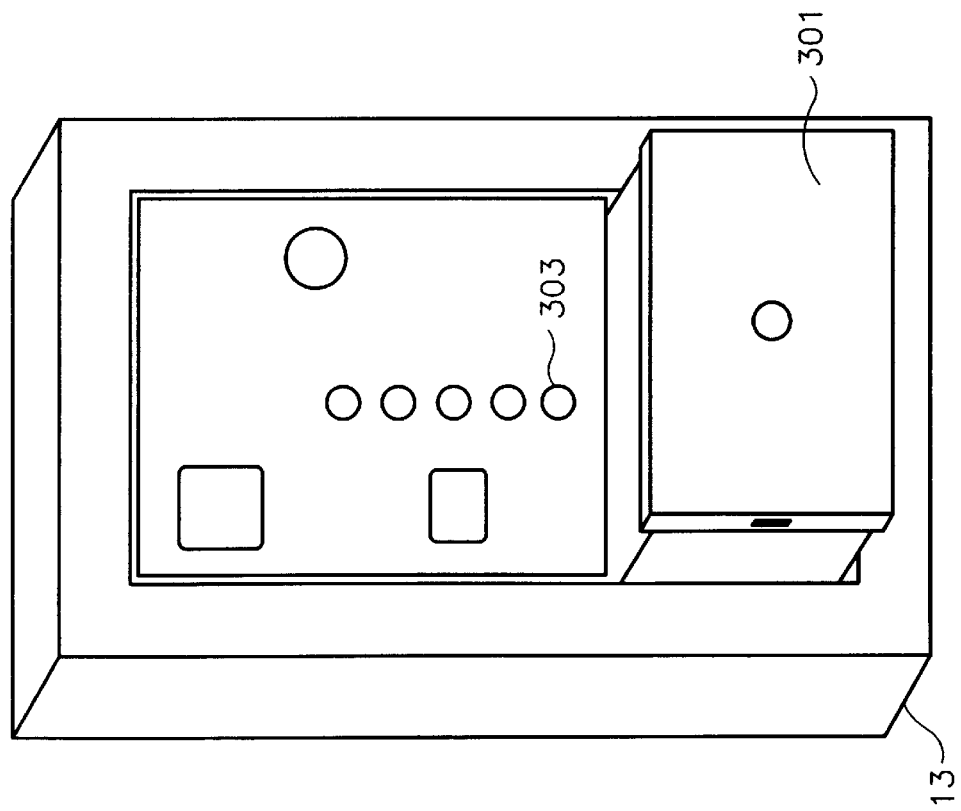
FIG. 20 is a view of an electronic coin-operated machine in a closed position.
Figure 22:
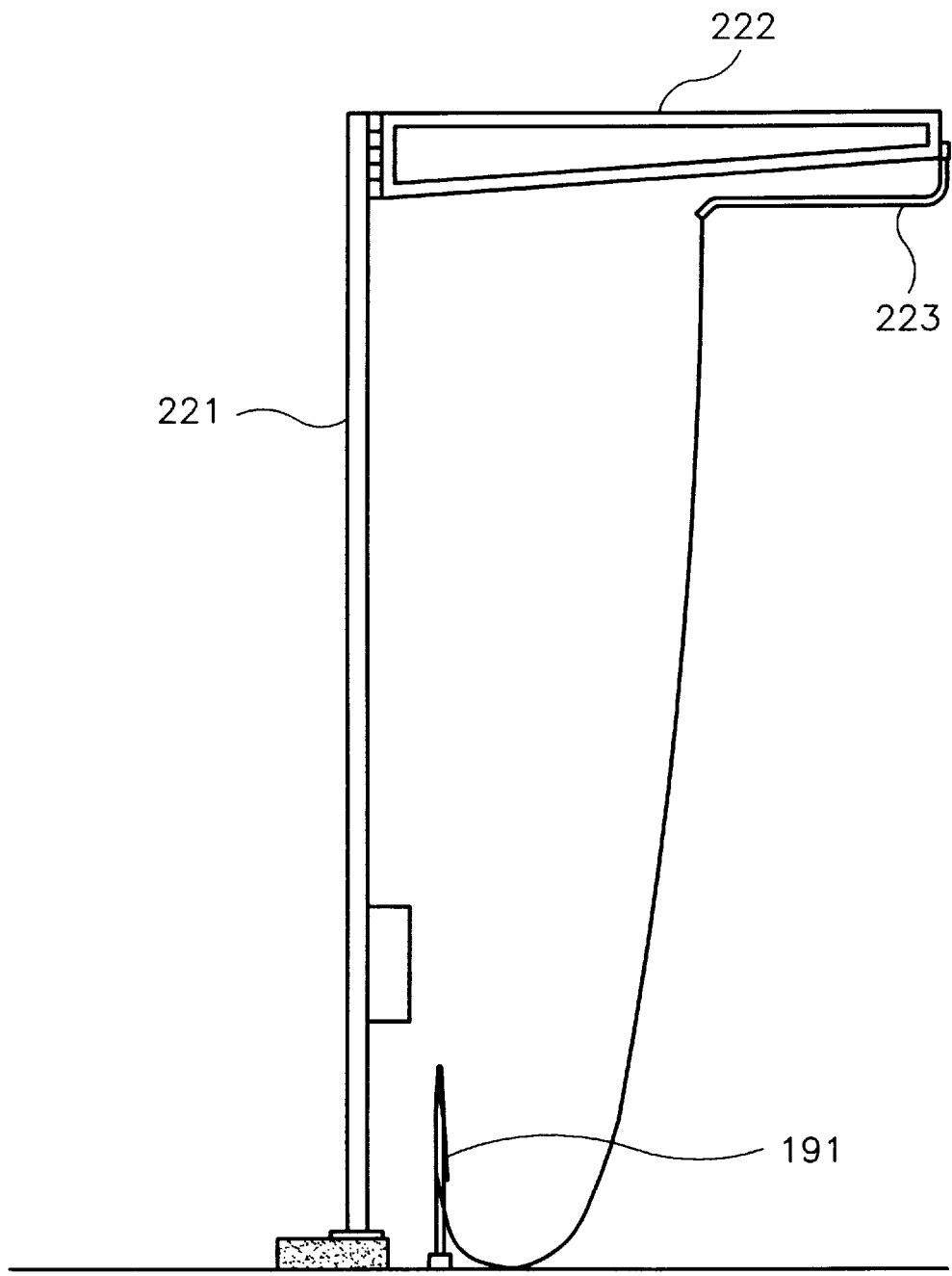
FIG. 22 is a view of a rotating arm suspended from a post.
Figure 23:
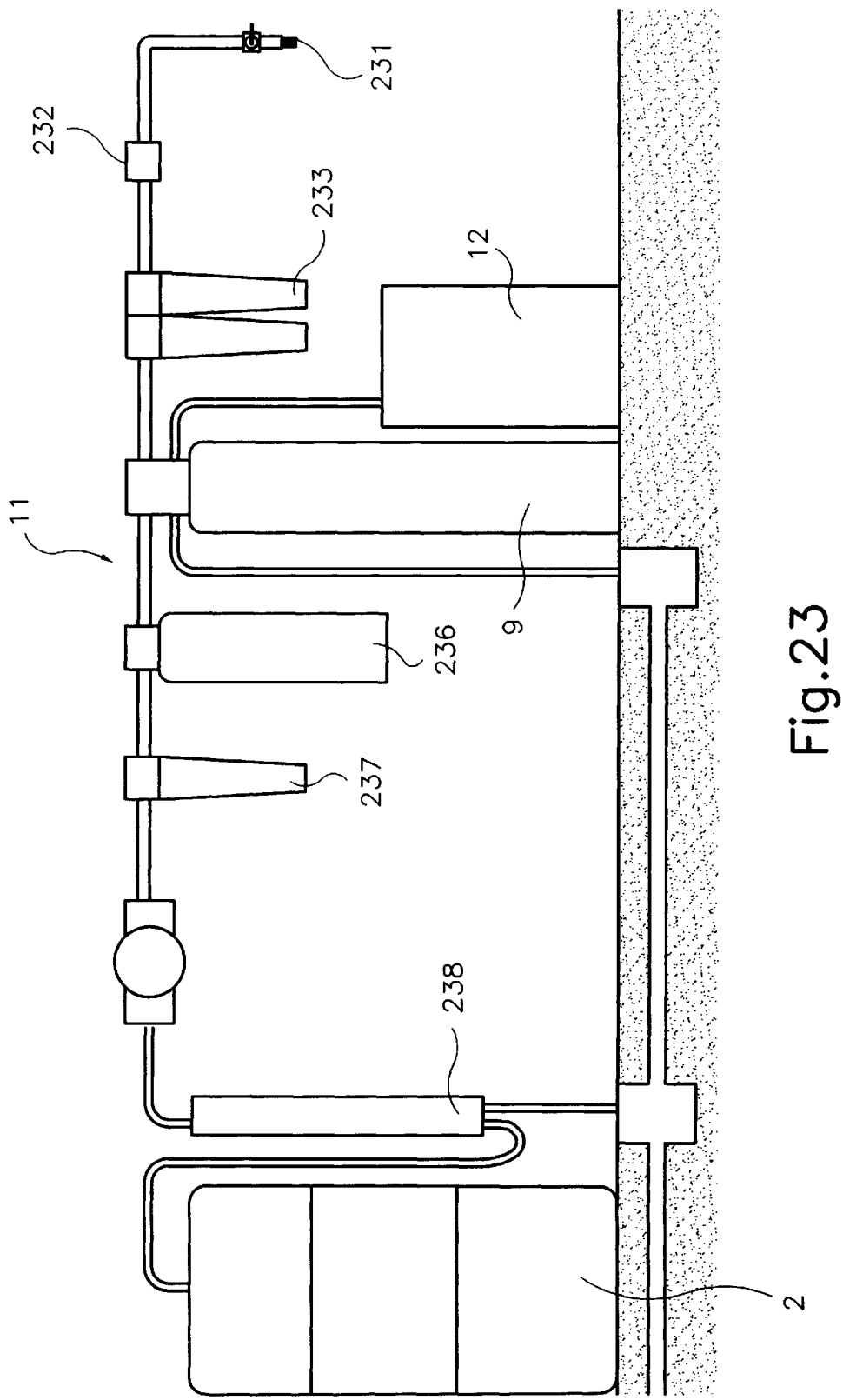
FIG. 23 is a schematic view of the water circuit in the engine room.
Figure 24:
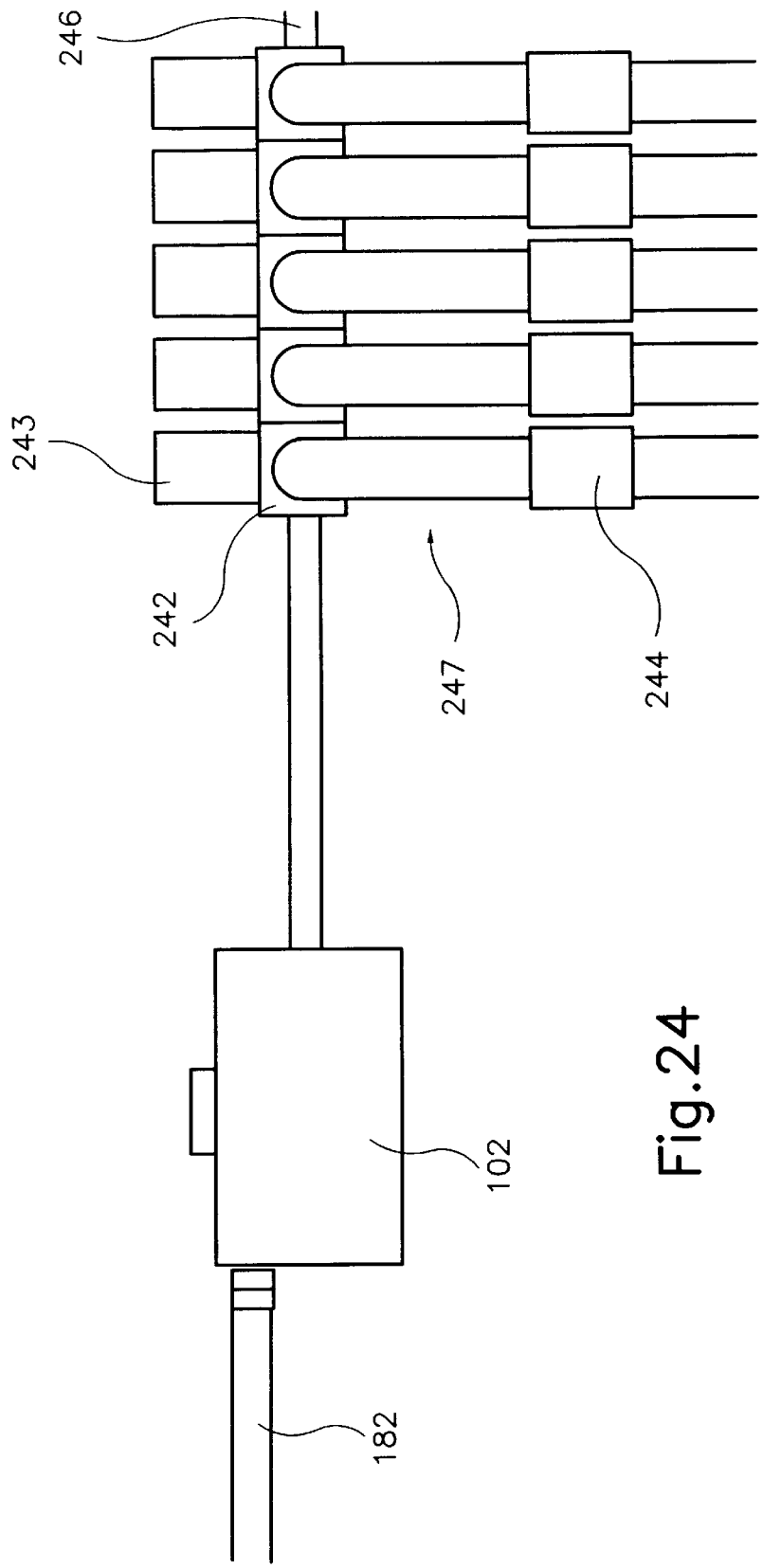
FIG. 24 is a schematic view of a delivery system of pressurized water.
Figure 25:
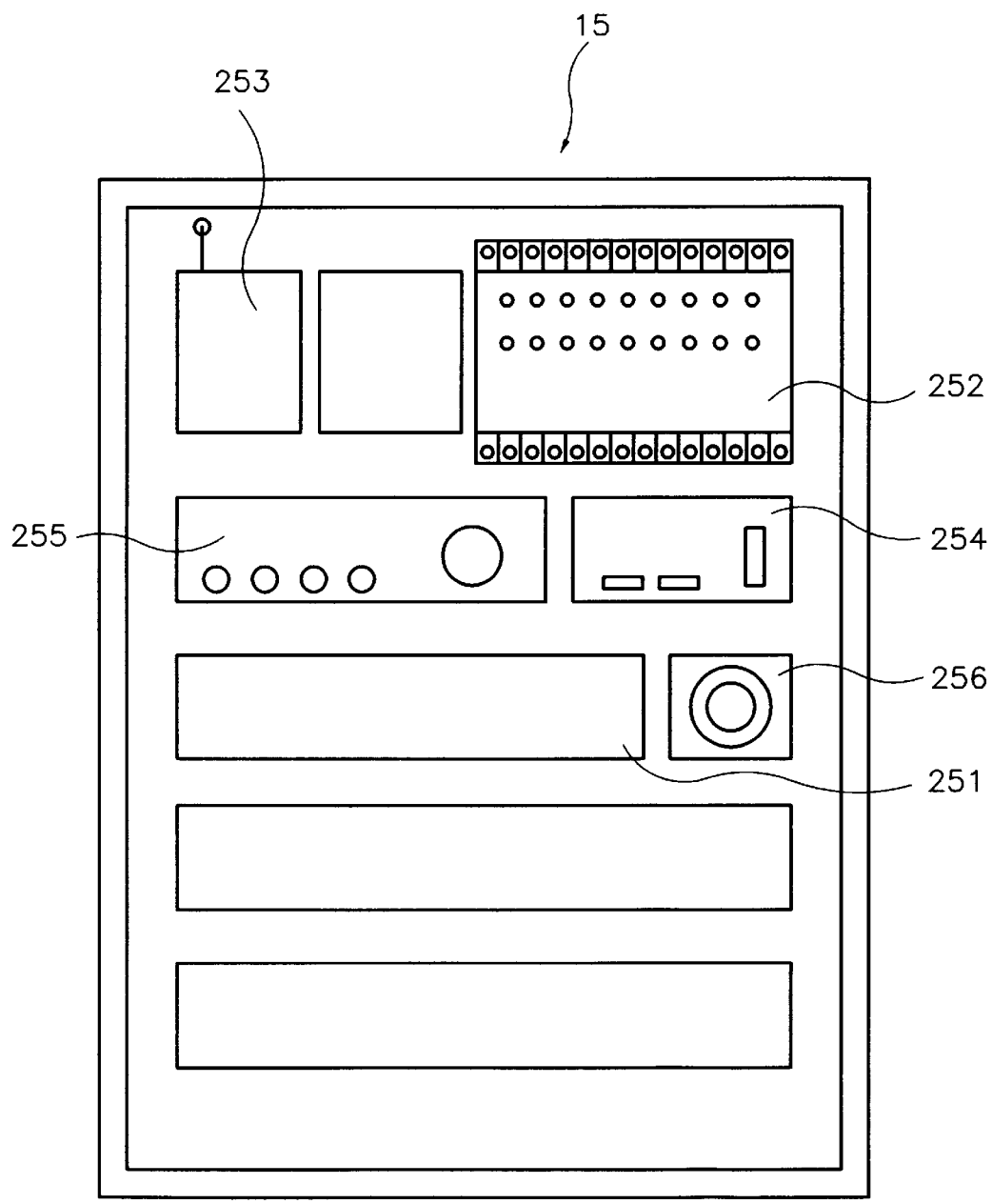
FIG. 25 is a schematic view of a control cabinet including an electric switchboard and robot.
Figure 26:
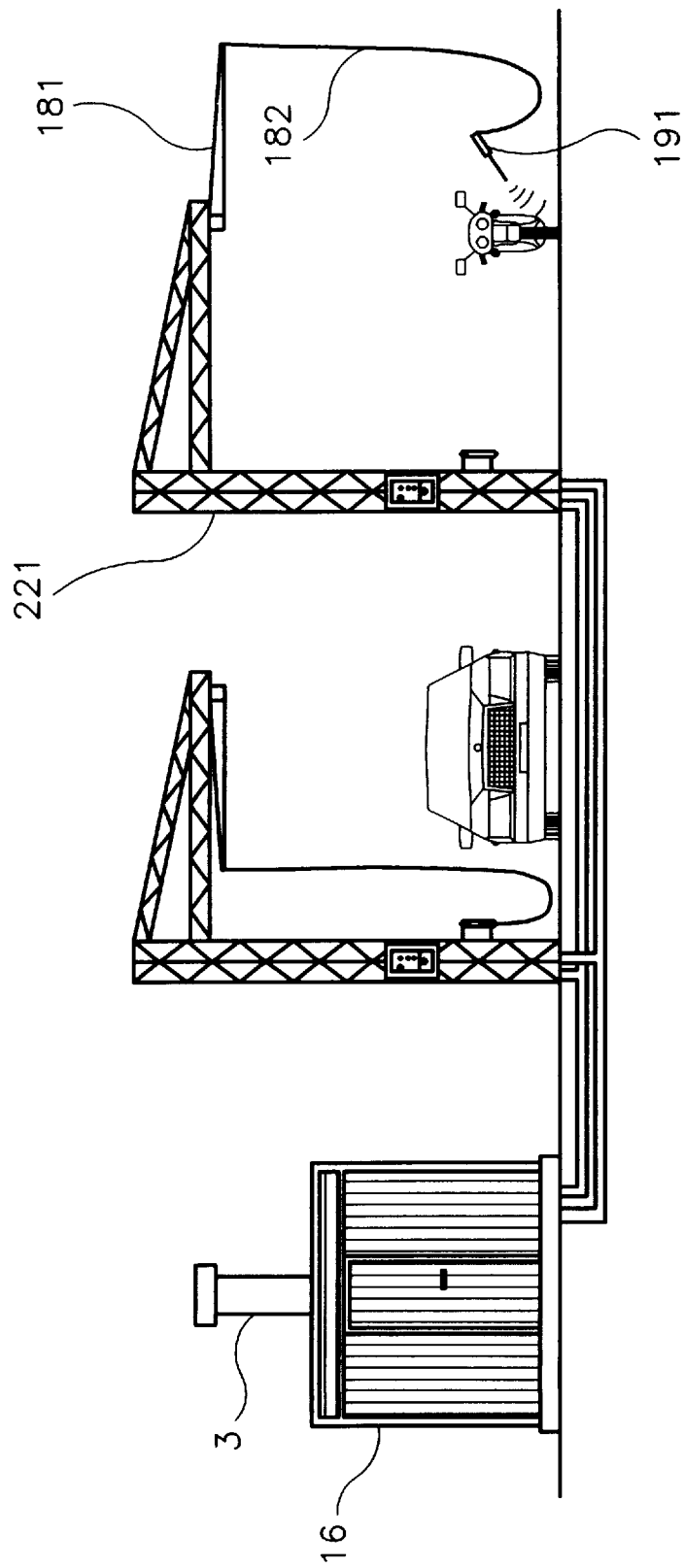
FIG. 26 is a perspective view of a first embodiment of an open-air washing center.
Figure 27:
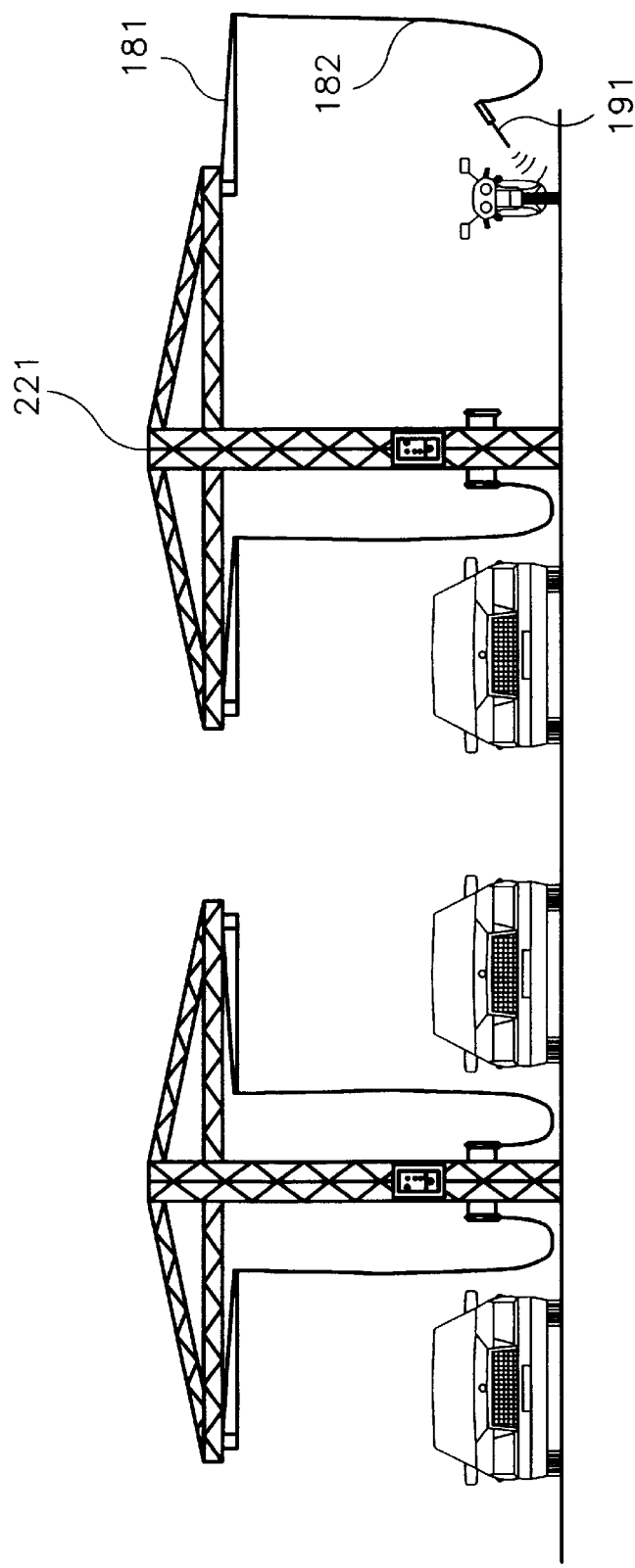
FIG. 27 is a perspective view of a second embodiment of an open-air washing center.

FIG. 1 shows a schematic view of the compact plant which contains the machines needed in order to provide the washing waters.

In FIGS. 1–5, the element marked with number 1 shows the diesel tank. 2 shows the osmotized water tank. 3 is the chimney for the evacuation of combustion gases. 4 shows the hot water accumulator. 5 is the boiler. 6 the burner. 101 shows any of the four possible electric motors that the compact plant can house. 102 is any of the corresponding four pressure pumps. 103 shows any of the measurement pumps for detergent to be injected into the output water in the first stage of the wash. 9 is the place for the two parallel cationic exchangers. 10 shows the place for the water intake filters. 11 shows the osmosis plant. 12 is the salts tank. 13 is the electronic coin slot where the user pays for using the service given by the plant and selects the desired wash option. 15 is the place for the electric switchboard and robot.

FIGS. 6 and 7 show a detailed view of the pressure pump installation and its corresponding attachments in the particular case of them being four. On it 101 shows the electric motors, 102 shows the pressure pumps, 103 shows the detergent measurement pumps and 104 shows the removable trays on which each pressure pump unit and its attachments are placed.

FIGS. 8–16 show the structure of the chassis of each one of the six surfaces which limit the house. 201 shows the frame of the ceiling, provided with two stays 83 and at the ends of each one of them there is a flatbar. Two or four holes 82 have been made in each one of the four flatbars 81. These perforated flatbars 81 have a double function, one is to act as the place for fitting other flatbars which will hold and raise the whole machine room for movement; the other function envisaged is for, when the move is completed and the additional flatbars have been removed, the stay flatbars in the ceiling will be used as the place for holding the upper tubular structure. 202 shows one of the short walls, with a diagonal reinforcement stay. 203 shows one of the long walls, where the two right-hand stays are envisaged for holding the removable trays 104 which carry the pressure pumps and their attachments, as shown in FIGS. 6 and 7. 204 shows the other short wall which has a horizontal stay 111 which will be used to hold the filters to main supply of water; the diagonal stay 91 is for reinforcement. 205 shows the chassis of the entrance door 184, reinforced by two cross-sections 121, and which is located on the other long wall, which is marked as number 206. 207 shows the four pieces of metallic paving for the house which can be adapted to the reinforced structure of the floor of the house and which is marked as number 208. This lower face of the house is reinforced by stays with a strong mechanical resistance as it is envisaged that they may support the weight of the whole installation in the cases in which it has to be lifted and transported by a crane.

A preferential realisation of the invention is destined to washing, by means of prior payment in coins, of motor vehicles or their trailers such as cars, motorcycles, lorries, coaches, boats, bicycles, caravans. It is installed on the chosen land and is made up of an engine room 16, a structure, exterior image, electronic coin-operated machine 13 and a number (from one to four) of rotating arms 181, with a pressure hose 182 hanging from the end of each one connected at the end to, a nozzle shuttle 191.

Housed inside the engine room are:

A heating system 4, 5, 6, 41 for inside the engine room so as to prevent the fluids inside from freezing when the environmental temperatures may cause this. The heating system is formed by hot water accumulator 4, the boiler 5, the burner 6, and the heat exchanger 41.

A system for evacuating fluid from the high pressure hoses 182, the pressure pumps 102, the manifold 247, the filters 10, 233, 236, 237 which are subject to the risk of freezing.

Some pressure pumps 102 (from one to four, with ceramic pistons and stainless steel heads laid out in battery on removable stainless steel frame or removable trays 104.

Some electric motors 101 (as many as pressure pumps) 2.2 kW in power, each one driving the corresponding pressure pump.

Some detergent measurement pumps 103 (as many as pressure pumps), adjustable, high pressure which inject the measurement of detergent into the water in the first stage of the wash. A conventional electrovalve, for example a flow regulator 243 and non-return valve 244, allows the pump to feed the hot water circuit with the preestablished measurement of detergent for that first stage of the wash.

At the intake 242 of each pressure pump there is a manifold 247 with four mouths. One of them acts during the first stage of the wash, when the dirt is emulsified, and it has the purpose of allowing the passage of delimed water with the preestablished measurement of detergent. Another mouth acts during the second stage of the wash, rinsing and allows the passage of the delimed environmental temperature water. Another mouth acts during the third stage of the wash, the shining, and allows the passage of the osmotized environmental temperature water. Each one of these mouths has its corresponding zero pressure electrovalve. Each electrovalve is in turn complemented with a directional or non-return valve 241 whose job it is to prevent the return of undesired liquids through this electrovalve, as without this precaution a washing liquid would mix with any of the others by return. The fourth mouth is used for purging the excess pressure of the pressure pump, which may be caused by fortuitous reasons like for example, the pinching of the hose 182, and has a conventional pressure valve; the purge in these cases opens the pressure valve where water comes out taking it to the pump feed pipe, so that a circuit is closed with no loss of liquid nor excess pressure in the areas from the valve to the point of blockage.

A stainless steel pressure valve 232 with the aim of suspending the working of the whole plant when the intake pressure of the main supply 231 of water does not reach the minimum-required.

A water heating system made up of a column, in the base of which a boiler 5 and burner 6 are housed, supported by the top is the hot water accumulator 4 with its thermostat and manometer controls. This layout allows a high heating performance.

A water treatment plant. The water from the place where the installation is located must be analyzed previously and the physio-chemical characteristics of the treatment will be adjusted, according to usual practice in the current state of water treatment techniques, to the maximum and minimum limits of content in salts, organic substances, gases, particles in suspension or gelled, etc. so as to provide final water which will always have the necessary technical characteristics described here. The osmotizing plant 11 is made up of a first 80 micron membrane filter 233 for filtering solid particles. Next the water passes through another filter which will have the aim of removing the cloud and which is made up of several layers of different minerals capable of retaining particles of a size up to 10 micras. The water then passes through two active carbon filters 236 and then through a filter 237 which removes particles of a size greater than 5 micras. Finally the water passes through the inverse osmosis filters or osmotixation torpedoes which are necessary according to the nature of the water in the locality, in order to reduce the conductivity to an approximate value of 10 micro-siemens. The characteristics of the water obtained in this way are, then, that of a water free from particles, deionised, with a hardness which should not be greater than 5° French degrees and a conductivity of approximately 10 micro-siemens. The water which must pass through the osmosis filters 238 will be previously heated to a preestablished temperature so as to guarantee the osmotization performance.

A clock 256 which at a preestablished time will stop the osmosis plant and will activate the regeneration of ion exchanger resin.

A salt-brine tank 12 for regenerating the ion exchanger resin.

A motor which will pump the brine through the columns where the ion exchanger resin is located.

A control cabinet 15 where a robot is housed with the-option of output by modem, which controls and regulates the whole plant. The electrical system is conceived and designed so that it operates individually for each one of the washing areas 187, whose number in this specific example may be up to four, so that each area can be at a different washing stage and also any fault will be individualised from the rest. The robot is equipped with an RS 232 interface card 231 for entering the desired programs, which will at least be three. The first and fundamental one is the integral management of the plant and each one of the washing areas. The second one will be control and alarm to warn of faults, breakdowns or low levels of storage of consumable liquids under the preestablished minimum. The third will be communication via modem for transmitting and receving remote data and instructions, and which will allow remote control of takings, times of stoppage, maintenance, price changes per service, statistics, etc. These three functions ensure the maximum reliability and functionality of the washing centre.

An safety alarm 254 which is operated when unauthorised persons open the door 184 to the engine room 16 or the electronic coin-operated machine 13.

A generator 255 for piped music which will entertain and eliminate any possible feeling of loneliness or isolation for the user, especially when the installation is away from the main buildings.

The external front of the electric box will house the individual service counters for each one of the washing areas, as well as for the other external service machinery which may exist, for example vacuum cleaners for cleaning the passenger compartment of closed vehicles as in the case of cars, caravans or lorries.

At the top of the façade of the plant, an alarm light will be placed which will be activated by the internal robot when a fault, breakdown or critical reduction in the levels of the consumable fluids is detected.

This preferential realisation is built in heat-lacquered steel sandwich and foam polyurethane which provides sound-proofing and thermal insulation.

The box model structure, which is the one which offers ceiling 185 and walls to the vehicle to be washed, is made of treated steel and, in order to give the desired image, it will all be hidden by the finishing elements the owner or person offering the service wishes. Each one of the washing areas 187, where there is a shuttle 191 and drainage, has a false ceiling made of interlocking PVC profiles fitted to the façade canopy, on whose surface two luminous, fluorescent anti-damp tube screens are housed for night lighting.

The façade canopy is preferably made of translucid polycarbonate with an adhesive strip in coloured vinyl, which allows the service offered to be personalised with the desired image.

The separations between the washing areas will be made of polycarbonate sheets, assembled together with lacquered aluminium profiles.

In the geometric centre of the ceiling of each washing place area 187 there is a rotating arm made of stainless steel. The hose which carries the pressurised washing water goes to this arm 181. From the rotating arm hangs a piece of hose 182 at the end of which is the shuttle 191, which is made of stainless steel and according to the ergonomic regulations of use in order to ease the way of grasping it and comfortable use. The nozzle 192 of the shuttle 191 does not have a brush and is made of ceramics, which provides advantages like minimum wear and open form in order to supply a jet under open pressure in a slight fan.

The support which houses each shuttle is made of stainless steel and forms an open U-shape at the top, which allows the shuttle to be grasped and left.

The option for washing lorries and coaches has the rotating arm articulated into two arms 222, 223, made of treated steel, painted with epoxy resin. These arms 222, 223 hang from the top of a six meter high post 221 which provides the rotation radius necessary for comfortable washing.

The micro-filtered, delimed hot water and osmotized water tanks 2 ensure immediate delivery of these liquids.

The electronic coin-operated machines 13 are multi-coin and accumulative and have the selection buttons 303 for selecting the washing option desired. They are designed to accept up to six different types of coin or token. They can be programmed easily in order to deal with changes to other types of coin, as in the case of the appearance of new coins or when installed in different countries. The slot machine can be equipped with a set of microswitches 211 in order to control the duration of the passes on the counter and therefore the cost of the service.

When dealing with upper tubular structure models without a ceiling or walls housing the washing area 187, or the canopy model which has a protective ceiling over the washing area, the electronic coin-operated machine 13 is installed on the external wall of the engine room 16. When dealing with the box model, the slot machine can also go on the dividing wall between two washing areas 187. In the tubular mast structure where the engine room 16 is at a distance from the washing area 187 and they have the rotating arm 181 hanging from an arm 261 fixed to a separately dispossed mast 221, the slot machine is installed on the aforementioned mast. The electronic coin-operated machine 13 is made of stainless steel, and is made up of two bodies with independent access. The first one is located at the top and houses the electronic coin counter system 212, as well as the buttons 303 for selecting each one of the washing process options. The second body is located at the bottom and houses the box 301 where the coins inserted are deposited; the type of construction and locking system of this element are designed like a safe. The lower body or coin box 301 is removable for custody during periods when the installation is not operative, so as to protect the device from possible deterioration through robbery attempts.

The detergent used in the washing stage in order to emulsify the dirt has an approximate compound of 5% potasium bleach, 10% triazine, 20% ethylene glycol, 30% triethylamine and 35% triethylamin chloride.

It is not considered necessary to give a more detailed description so that any expert in the matter can understand the scope of the invention and the advantages derived from it.

The terms in which this memo has been written should always be taken in the widest and non-limiting sense.

It will be understood that each of the elements described above, or two or more together, may also find a useful application in other types of washing plants differing from the types described above.

While the invention has been illustrated and described as embodied in the context of a washing center for machinery, it is not intended to be limited to the details shown, since various modifications and structural changes may be made without departing in any way from the spirit of the present invention.

Without further analysis, the foregoing will so fully reveal the gist of the present invention that others can, by applying current knowledge, readily adapt it for various applications without omitting features that, from the standpoint of prior art, fairly constitute essential characteristics of the generic or specific aspects of this invention.

What is claimed as new and desired to be protected by Letters Patent is set forth in the appended claims:

1. A plant for washing machinery, comprising
   an engine room, in which water from a main supply is filtered, purified and prepared to perform a washing process of three stages of washing including prewashing, washing, rinsing,
   a structure housing washing machinery and supporting partly or totally external structures for carrying out the washing process, and
   a rotating arm disposed at the structure,
   a high pressure hose carrying a liquid having a temperature greater than ambient temperature and hanging from the rotating arm,
   a shuttle assembled to the high pressure hose, wherein washing water comes from a nozzle of the high pressure hose, an electronic coin-operated machine with selection buttons for the washing process including the stages of prewashing, washing, and rinsing, and a drying and polishing stage, wherein the engine room contains one or several of the following elements:
   a diesel tank,
   an osmotized water tank,
   a chimney for evacuating gases,
   a hot water accumulator,
   a boiler,
   a burner,
   a heat exchanger,
   an electric motor,
   a pressure pump,
   two cationic exchangers,
   an anionic exchanger,
   a water intake filter,
   an osmotizing plant,
   a salt tank,
   a detergent measurement pump,
   a control cabinet including an electronic mechanism which operates individually for each one of the external structures for carrying out the washing process and carries out at least one of the following operations:
   managing of operation of each one of the elements in the engine room,
   associating fault alarms a corresponding external structure for carrying out the washing process,
   reacting when an alarm signal reaches the control cabinet,
   receiving new instructions by modem about new pricing of washing service,
   sending data accumulated since a reference point.

2. The plant according to claim 1, wherein the engine room is contained in a construction of 9 cubic meters or less, laid out on a rectangular floor of approximately 1.5 meters by 2.5 meters.

3. The plant according to claim 1, wherein the engine room is disposed adjoining to the washing area.

4. The plant according to claim 1, wherein the engine room is connected to the washing area by means of the high pressure hose capable of transporting water under a pressure of between 50 and 110 bars and at a temperature of between 40 to 90° C., and wherein the high pressure hose ends in the shuttle out of whose nozzle comes the washing water.

5. The plant according to claim 4, wherein the rotating arm is disposed in a geometric center of the washing area, wherein the high pressure hose is connected to the rotating arm, and wherein the rotating arm is articulated into two arms which hang from a top of a six meter high post to perform the washing process of lorries and coaches.

6. The plant according to claim 1, wherein its service is offered to a user in exchange for inserting coins or tokens into the electronic coin-operated machine, wherein the selection buttons of the electronic coin-operated machine serve for selecting a desired washing service, and wherein the coins are accumulated in a removable coin box.

7. The plant according to claim 1, wherein the washing process is made up of a combination of any of some or all four of the following stages:
   prewash at a temperature of between ambient temperature and 90° C. with a measured amount of detergent;
   wash with hot water at a temperature of between 40° C. and 90° C., at a pressure between 50 and 110 bars containing detergent in a proportion of between 5% and 40% by weight and at a pressure of between 50 and 110 bars;
   rinsing with micro-filtered, delimed water;
   drying and polishing with osmotized water at a pressure of between 50 and 110 bars;
   wherein the hot water is pretreated by means of a first filter disposed at the osmotizing plant and which removes particles of a size larger than 80 microns in suspension, wherein the hot water is pretreated by means of the cationic exchangers:

and wherein the hot water, pretreated with the first filter, is kept at a temperature of between 40° C. and 90° C. in the osmotized water tank.

8. The plant according to claim 7, wherein the rinsing is carried out with water at ambient temperature from the main supply, pretreated by means of filters which remove particles of a size larger than 80 microns in suspension and by means of the cationic exchangers and at a pressure of between 50 and 110 bars.

9. The plant according to claim 7, wherein the polishing and drying are carried out with water treated through the osmotizing plant at ambient temperature and at a pressure of between 50 and 110 bars;

wherein the water, pretreated by means of filters which remove particles of a size larger than 80 microns in suspension and by means of the cationic exchangers, is fed to and treated in the osmotizing plant, wherein said water is heated to a preestablished temperature in order to guarantee an osmotization, and wherein the osmotizing plant incorporates at least two filters of particles of up to ten microns, from one to four active carbon filters, from one to four filters of particles of up to five microns, of one to four osmotization torpedoes with production membranes for between 50 and 80 liters of water per hour, and the osmotized water tank.

10. The plant according to claim 1, wherein the pressure pump supplies the hot water and incorporates the detergent measurement pump, wherein the detergent measurement pump measures detergent and adds the detergent to the hot water of a respective stage of washing.

11. The plant according to claim 1, wherein the engine room contains from one to four pressure pumps, a first one of the pressure pumps accompanied by the electric motor, a flow regulator, and the detergent measurement pump and each other one of the pressure pumps accompanied by another electric motor, by another flow regulator, and by another detergent measurement pump;

wherein one engine room deals with between one and four independent washing areas.

12. The plant according to claim 1, wherein the measurement of flow to a manifold of the pressure pump is performed by one of a conventional electrovalve, a zero pressure valve, a helicoidal or ball tap, and a mixer lever, operated by the electric motor or a pneumatic adjustment valve by an electrovalve.

13. The plant according to claim 1, wherein an intake of the pressure pump has a manifold with a minimum of three and a maximum of six mouths.

14. The plant according to claim 13, wherein one of the manifold mouths of the pressure pump operates during the washing stage with the aim of allowing a passage of hot delimed water with a preestablished measurement of detergent.

15. The plant according to claim 13, wherein one of the manifold mouths of the pressure pump operates during the rinsing stage with the aim of allowing a passage of microfiltered, delimed water at a temperature according to that of the engine room.

16. The plant according to claim 13, wherein one of the manifold mouths of the pressure pump operates during the third washing stage with the aim of allowing a passage of osmotized water at ambient temperature.

17. The plant according to claim 13, wherein the manifold mouths of the pressure pump are provided with flow regulators, each one of them complemented with a directional or non-return valve.

18. The plant according to claim 13, wherein one of the manifold mouths of the pressure pump is connected by means of the high pressure hose to an output pipe of said pressure pump.

19. The plant according to claim 1, wherein the electronic mechanism is equipped with an RS 232 interface card.

20. The plant according to claim 1, wherein the electronic mechanism manages the working of the engine room and controls break-downs, faults and levels of consumable liquids.

21. The plant according to claim 1, wherein the plant is equipped with the electronic mechanism for transmitting and receiving data and instructions.

22. The plant according to claim 1, further comprising a pressure-stat valve disposed at the main supply of water;

wherein the plant is equipped with a safety burglar alarm, wherein the plant is equipped with a generator of piped-in music, wherein the plant is located inside a cubic building, wherein the cubic building is formed as a solidly joined unit based on a connection between floor and walls and walls and ceiling, wherein a ceiling of the cubic building has a frame formed by four flatbars, wherein each flatbar has two or four holes, wherein the plant is provided with a door with a lock, internal lighting and enough free space inside for at least two people.

23. The plant according to claim 1, wherein the pressure at which the washing water is dispersed is provided by a compact piece of equipment made up of the electric motor, the pressure pump and the detergent measurement pump, and wherein the electric motor, the pressure pump and the detergent measurement pump have necessary connections and are placed on a single tray removably attached on a long wall of a cubic building of the engine room, wherein the compact piece of equipment is placed in and removed from the engine room as a single unit.

24. The plant according to claim 1, wherein the plant includes space to allow a placement of elements necessary to provide service to from one to four washing areas, and to place working control elements for up to four external complementary service machines; and further comprising a timer clock disposed inside the control cabinet for timing a part of the electronic mechanism included in the control cabinet;

a heating system inside the engine room;

a system for evacuating fluid from the high pressure hoses, the pressure pumps, the manifold, the filters which are subject to a risk of freezing;

an access hatch to the main supply of water, electric cable box and drains;

wherein the engine room is disposed remote from the washing area.

25. A washing center comprising a compact plant including an engine room, in which water from a main supply is filtered, purified and prepared to perform a washing process of three stages of washing including prewashing, washing, rinsing, wherein a pressure pump has at an intake a manifold with four mouths from which a first mouth acts during the prewashing and the washing and a second mouth acts during the rinsing, a building structure for housing washing machinery and supporting partly or totally external structures for carrying out the washing process, a rotating arm disposed at the building structure, a high pressure hose carrying a liquid having a temperature greater than ambient temperature and hanging from the rotating arm;

a shuttle attached to the high pressure hose, wherein washing water comes from a nozzle of the high pressure hose, a coin-operated electronic machine with selection buttons for the washing process including the stages of prewashing, washing, and rinsing, and a drying and polishing stage;

washing areas selected of a member of the group consisting of a washing area without ceilings or walls, served by the high pressure hose which comes from a tubular structure fastened to a ceiling of the engine room, a washing area with ceiling but without walls, served by the high pressure hose which comes from the ceiling, a washing area with a ceiling and walls, served by the high pressure hose which comes from ceiling, and a washing area disposed remote from the engine room and equipped with a 2 to 6 meter high post, the top of which has a fixed elevated arm from which the high pressure hose comes;

and wherein the rotating arm is disposed in a geometric center of every washing area.

26. The washing center according to claim 25, wherein a time of use is regulated by means of a manual micro-switch system inside the electronic coin-operated machine or by means of an electronic program recorded in an electric switchboard and robot inside a control cabinet in the engine room;

wherein the machinery washing stage uses a detergent composed of approximately 5% potassium bleach, 10% triazine, 20% ethylene glycol, 30% triethylamine and 35% triethylamine chlorine.

27. A plant for washing machinery, comprising an engine room, in which water from a main supply is filtered, purified and prepared to perform a washing process of three stages of washing including prewashing, washing, rinsing, a structure housing washing machinery and supporting partly or totally external structures for carrying out the washing process, and a rotating arm disposed at the structure, a high pressure hose carrying a liquid having a temperature greater than ambient temperature and hanging from the rotating arm, a shuttle assembled to the high pressure hose, wherein washing water comes from a nozzle of the high pressure hose, an electronic coin-operated machine with selection buttons for the washing process including the stages of prewashing, washing, and rinsing, and a drying and polishing stage, wherein the engine room contains one or several of the following elements:

means providing a supply of cleaning fluid and the heating thereof, filtering and purifying means, a control cabinet including an electronic mechanism which operates individually for each one of the external structures for carrying out the washing process and carries out at least one of the following operations:

managing of operation of each one of the elements in the engine room, associating fault alarms a corresponding external structure for carrying out the washing process, reacting when an alarm signal reaches the control cabinet, receiving new instructions by modem about new pricing of washing service, sending data accumulated since a reference point.

28. The plant according to claim 27, wherein the means providing a supply of cleaning fluid and the heating thereof includes:

a diesel tank, an osmotized water tank, a chimney for evacuating gases, a hot water accumulator, a boiler, a burner, a heat exchanger, an electric motor, a pressure pump.

29. The plant according to claim 27, wherein the filtering and purifying means includes:

two cationic exchangers, an anionic exchanger, a water intake filter, an osmotizing plant, a salt tank, a detergent measurement pump.

* * * * *